(12) United States Patent
Low et al.

(10) Patent No.: US 7,914,696 B2
(45) Date of Patent: Mar. 29, 2011

(54) HEAT TRANSFER COMPOSITIONS

(75) Inventors: Robert E. Low, Nercwys (GB); Stuart Corr, Warrington (GB)

(73) Assignee: Ineos Fluor Holdings Limited, Runcorn (Cheshire) (GB)

( * ) Notice: Subject to any disclaimer, the term of this patent is extended or adjusted under 35 U.S.C. 154(b) by 0 days.

(21) Appl. No.: 12/287,880

(22) Filed: Oct. 14, 2008

(65) Prior Publication Data

US 2009/0158771 A1 Jun. 25, 2009

(30) Foreign Application Priority Data

Oct. 12, 2007 (GB) .................................. 0719989.6
Aug. 1, 2008 (GB) .................................. 0814060.0

(51) Int. Cl.
*C09K 5/04* (2006.01)
*C08J 9/14* (2006.01)
*B08B 3/00* (2006.01)
*F03C 99/00* (2010.01)

(52) U.S. Cl. .............. 252/67; 252/68; 252/69; 252/364; 521/131; 62/114; 134/36; 60/531

(58) Field of Classification Search .................... 252/67, 252/68, 69, 364; 521/131; 62/114; 134/36; 60/531
See application file for complete search history.

(56) References Cited

U.S. PATENT DOCUMENTS

| | | | |
|---|---|---|---|
| 3,723,318 A | 3/1973 | Butler | |
| 6,243,944 B1 | 6/2001 | Tustaniwskyj et al. | |
| 6,243,945 B1 | 6/2001 | Fujimoto et al. | |
| 6,426,019 B1 * | 7/2002 | Acharya et al. | 252/67 |
| 6,881,354 B2 * | 4/2005 | Arman et al. | 252/67 |
| 2003/0042463 A1 * | 3/2003 | Arman et al. | 252/67 |
| 2004/0127383 A1 | 7/2004 | Pham et al. | |
| 2004/0256594 A1 | 12/2004 | Singh et al. | |
| 2005/0233932 A1 | 10/2005 | Singh et al. | |
| 2006/0243944 A1 | 11/2006 | Minor et al. | |
| 2006/0243945 A1 | 11/2006 | Minor et al. | |
| 2008/0230738 A1 * | 9/2008 | Minor et al. | 252/67 |

FOREIGN PATENT DOCUMENTS

| | | |
|---|---|---|
| CA | 668494 | 8/1963 |
| CN | 95117074.0 | 4/2002 |
| EP | 1832639 | 9/2007 |
| EP | 1832640 | 9/2007 |
| GB | 2435747 | 9/2007 |
| GB | 2440258 | 1/2008 |
| JP | 4-110388 | 4/1992 |
| RU | 2 073 058 | 2/1997 |
| WO | WO 2008/027555 | 3/2008 |
| WO | WO 2008/065011 | 6/2008 |
| WO | WO 2008/076272 | 6/2008 |
| WO | WO 2008/121783 | 10/2008 |
| WO | WO 2008/121785 | 10/2008 |
| WO | WO 2008121776 A1 * | 10/2008 |

OTHER PUBLICATIONS

Reg. No. 677-21-4, Nov. 16, 1984.*
Reg. No. 811-97-2, Nov. 16, 1984.*
Reg. No. 75-10-5, Nov. 16, 1984.*
Nagel, M.: Bier, K. *Int. J. Refrig.*, 18, 534-543, 1995.
Kleiber et al. *Fluid Phase Equilibria*, 92, 149-194, 1994.
Rivollet et al. *Fluid Phase Equilibria*, 218, 95-101, 2004.
Lee et al., *J. Chem. Eng. Data*, 50, 419-424, 2005.
Van Ness et al., *AIChE Journal*, 24, 1055-1063, 1978.
*Fluorocarbon Refrigerants Handbook*, Chapter 3, Downing, Prentice-Hall, 1988.

* cited by examiner

*Primary Examiner* — Douglas McGinty
(74) *Attorney, Agent, or Firm* — Ryan Kromholz & Manion, S.C.

(57) ABSTRACT

Heat transfer compositions are usable in their own right or are suitable as a replacement for existing refrigeration usages. The compositions possess a reduced Greenhouse Warming Potential, yet have a capacity and energy efficiency (which may be conveniently expressed as the "Coefficient of Performance") ideally within 20% of the values of those attained using R-134a, and preferably within 10% or less (e.g. about 5%) of these values.

58 Claims, 2 Drawing Sheets

HEAT TRANSFER COMPOSITIONS

RELATED APPLICATIONS

This application claims priority to Great Britain Patent Application No. 0719989.6, filed Oct. 12, 2007 and Great Britain Patent Application Number 0814060.0, filed Aug. 1, 2008.

BACKGROUND OF THE INVENTION

The invention relates to heat transfer compositions, and in particular to heat transfer compositions which may be suitable as replacements for existing refrigerants such as R-134a, especially in (automotive) air-conditioning systems.

Mechanical refrigeration systems (and related heat transfer devices such as heat pumps and air-conditioning systems) are well known. In such systems, a refrigerant liquid evaporates at low pressure taking heat from the surrounding zone. The resulting vapour is then compressed and passed to a condenser where it condenses and gives off heat to a second zone, the condensate being returned through an expansion valve to the evaporator, so completing the cycle. Mechanical energy required for compressing the vapour and pumping the liquid is provided by, for example, an electric motor or an internal combustion engine.

In addition to having a suitable boiling point and a high latent heat of vaporisation, the properties preferred of a refrigerant include low toxicity, non-flammability, non-corrosivity, high stability and freedom from objectionable odour. Other desirable properties are ready compressibility at pressures below 25 bars, low discharge temperature on compression, high refrigeration capacity, high efficiency (high coefficient of performance) and an evaporator pressure in excess of 1 bar at the desired evaporation temperature.

Dichlorodifluoromethane (refrigerant R-12) possesses a suitable combination of properties and was for many years the most widely used refrigerant. Due to international concern that fully and partially halogenated chlorofluorocarbons, such as dichlorodifluoromethane and chlorodifluoromethane, were damaging the earth's protective ozone layer, there was general agreement that their manufacture and use should be severely restricted and eventually phased out completely. The use of dichlorodifluoromethane was phased out in the 1990's.

Whilst heat transfer devices of the type to which the present invention relates are essentially closed systems, loss of refrigerant to the atmosphere can occur due to leakage during operation of the equipment or during maintenance procedures. It was important, therefore, to replace fully and partially halogenated chlorofluorocarbon refrigerants by materials having low or zero ozone depletion potentials.

1,1,1,2-tetrafluoroethane (refrigerant R-134a) was introduced as a replacement refrigerant for R-12. However, despite having a low ozone depletion potential, R-134a has a greenhouse or global warming potential (GWP) of 1300.

More recently, concerns have arisen that significant concentrations of halocarbon refrigerants in the atmosphere might also contribute to global warming (the so-called greenhouse effect). It is desirable, therefore, to use refrigerants that not only exhibit low or zero ozone depletion potentials but which also have relatively short atmospheric lifetimes as a result of their ability to react with other atmospheric constituents such as hydroxyl radicals or as a result of ready degradation through photolytic processes.

There is also a need to provide alternative refrigerants having improved properties, such as low flammability.

There is also a need to provide alternative refrigerants that may be used in existing devices such as automotive air-conditioning devices with little or no modification.

R-1243zf is a low flammability refrigerant, and has a relatively low Greenhouse Warming Potential. Its boiling point, critical temperature, and other properties make it a potential alternative to higher GWP refrigerants such as R-134a. R-1243zf (also known as HFC-1243zf) is 3,3,3-trifluoropropene ($CF_3CH=CH_2$).

Similarly, difluoropropenes (designated as R-1252; the isomers and stereoisomers of difluoropropenes are encompassed by this description) also have relatively low Greenhouse Warming Potentials, and have other physical properties such as boiling points which make them suitable for use as refrigerants, especially as part of refrigerant blends.

However, the properties of these fluids alone is such that they are not ideal as direct replacements for R-134a. In particular, their capacity is too low, by which is meant that a refrigerator or air conditioning system having a fixed compressor displacement and designed for R-134a will deliver less cooling when charged with e.g. R-1243zf or R-1252 and controlled to the same operating temperatures. The capacity for air conditioning applications (evaporating temperature in the range 0 to 10° C.) is typically 75% that of R-134a. This deficiency is in addition to their flammability, which also affects their suitability as a substitute for R-134a when used alone.

SUMMARY OF THE INVENTION

A principal object of the present invention is therefore to provide a heat transfer composition which is usable in its own right or suitable as a replacement for existing refrigeration usages which should have a reduced Greenhouse Warming Potential, yet have a capacity and energy efficiency (which may be conveniently expressed as the "Coefficient of Performance") ideally within 20% of the values of those attained using R-134a, and preferably within 10% or less (e.g. about 5%) of these values. It is known in the art that differences of this order between fluids are usually resolvable by redesign of equipment and system operational features without entailing significant cost differences. The composition should also ideally have reduced toxicity and acceptable flammability.

In accordance with one aspect of the invention, there is provided a composition comprising R-1243zf (3,3,3 trifluoropropene), R-134a (1,1,1,2 tetrafluoroethane) and R-32 (difluoromethane). Unless otherwise stated, these compositions will be referred to hereinafter as the (ternary) compositions of the invention.

The compositions of the invention may be considered to have a low flammability, e.g. lower than R-1243zf on its own under the test conditions and protocol described in ASHRAE Standard 34 incorporating the ASTM Standard E-681 with test methodology as per Addendum 34p dated 2004.

Typically, flammability can be considered to be reduced/lower if: (i) the lower flammable limit (LFL) in air is increased, and/or (ii) the ignition energy required to initiate the combustion reaction is increased, and/or (iii) the speed of flame propagation is reduced. A composition of the invention with low flammability may also be non-flammable.

We have found that the compositions of the invention typically exhibit maxima in COP as the level of R-32 is increased from zero. The maxima locations vary slightly depending on the amounts of the other components and cycle conditions but in general they are found where the level of R-32 is constrained to between 5% and 15% by weight in the composition.

An object of the invention is to reduce the contribution to greenhouse warming resulting from the operation of an air-conditioning system, especially an automotive air-conditioning system. Improved energy efficiency reduces this contribution; finding such increases in energy efficiency of the system by adding a higher GWP component (R-32) is a second benefit of the lower overall GWP compositions thus provided.

DESCRIPTION OF THE PREFERRED EMBODIMENT

Figure 1:
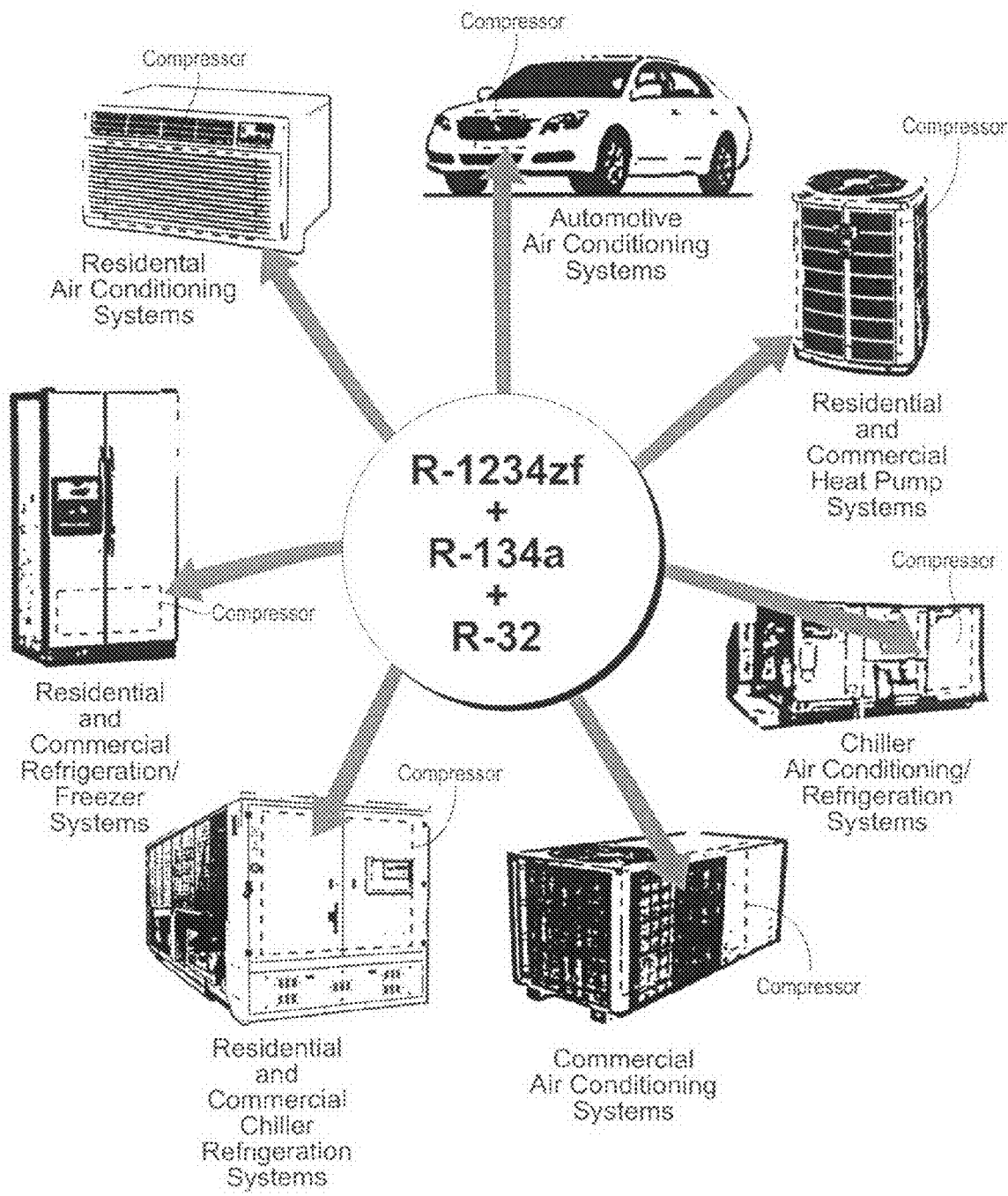
FIG. 1 is a diagrammatic view of an array of heat transfer devices that include a heat transfer composition comprising R-1243zf (3,3,3 trifluoropropene), R-134a (1,1,1,2 tetrafluoroethane) and R-32 (difluoromethane).

It has surprisingly been found that by addition of flammable R-32 and non-flammable R-134a to R-1243zf it may be possible to both increase the flammable limit of the fluid and to increase its capacity, while still having an acceptable GWP. This increase in flammable limit is unexpectedly higher than would be predicted on a theoretical consideration of the flammability limits of R-32 and R-1243zf alone.

Typically, the R-32/R-1243zf/R-134a blend contains from about 1 to about 30% R-32 w/w (or about 1.5 to about 20%), preferably from about 2 to about 15%, more preferably from about 3 to about 10%, for example from about 4 to about 8%.

Typically, the R-32/R-1243zf/R-134a blend contains a combined amount of R134a and 1243zf of from about 70 or 80 to about 99% w/w, preferably from about 75 to about 98%, more preferably from about 90 to about 97%, for example from about 92 to about 96%.

The ratio of R-1243zf:R-134a typically is selected so as to keep the GWP of the R-32/R-1243zf/R-134a blend below about 750, preferably below about 500 or 250, most preferably below about 150, depending on the application. For example, the ratio may be from about 20:1 to about 1:1, preferably from about 15:1 to about 5:1, for example from about 12:1 to about 8:1.

For example, the R-32/R-1243zf/R-134a blend may contain from about 0.1 to about 20% R-134a w/w, preferably from about 0.5 to about 15% or from about 1 to about 10%, for example from about 3 to about 9%; and from about 50 to about 98.9-99.1% R-1243zf w/w, preferably from about 70 to about 97.5% or from about 75 or 80 to about 96%, for example from about 83 to about 93%.

A particularly preferred R-32/R-1243zf/R-134a blend contains from about 4 to about 8% or about 5 to about 7% R-32 w/w (e.g. about 6%), from about 3 to about 9% or about 4 or 5 to about 8-6 R-134a (e.g. about 7%) and from about 80 to about 90 or about 82 or 84 to about 88 or 89% R-1243zf (e.g. about 87%). This composition range is particularly preferred for the replacement of R-134a, for example in air conditioning applications, particularly for automotive air conditioning.

Preferably, the compositions of the invention have a GWP less than that of the fluids they are intended to replace, for example lower than that of R-134a. Preferably the resultant heat transfer composition has a GWP less than 500, preferably less than 150, more preferably less than 100, more preferably less than 50.

Preferably also the resultant heat transfer composition has a capacity greater than that of R-134a alone.

Preferably, the compositions of the invention are non-flammable. As used herein, "non-flammable" refers to compounds or compositions which are determined to be non-flammable as determined in accordance with ASHRAE Standard 34 incorporating the ASTM Standard E-681 with test methodology as per Addendum 34p dated 2004, the entire content of which is incorporated herein by reference.

In some applications it may not be necessary for the formulation to be classed as non-flammable by the ASHRAE 34 methodology; it is possible to develop fluids whose flammability limits will be sufficiently reduced in air to render them safe for use in the application, for example if it is physically not possible to make a flammable mixture by leaking the refrigeration equipment charge into the surrounds. One example of such an application is that of mobile air conditioning technology embodying the secondary loop approach for isolation of the refrigerant from the passenger compartment air supply by using an intermediary heat transfer fluid such as glycol to transfer heat between air and refrigerant.

We have found that the R-32/R-1243zf/R-134a blends described can exhibit reduced flammability compared to R-1243zf alone.

In a preferred embodiment, the compositions of the invention have a lower flammability limit (LFL) (as measured in accordance with the ASHRAE methodology hereinbefore defined) of at least 4% v/v in air, preferably at least 4.5% or 5%. More preferably, the compositions have a lower flammability limit that is higher than R-1243zf alone.

Compositions according to the invention typically have improved capacity compared to R-134a and/or R-1243zf alone. In one facet, the invention provides the incorporation of a relatively small proportion of a further compound, which further compound may be flammable, have a higher GWP, or both, to provide a resultant composition, preferably a heat transfer composition having both a relatively low GWP and a relatively low or substantially no flammability characteristic, and relatively small temperature "glide", yet providing improved Coefficient of Performance.

Temperature glide, which can be thought of as the difference between bubble point and dew point temperatures of a non-azeotropic mixture at constant pressure, is a characteristic of a refrigerant blend. If it is desired to replace a pure fluid with a mixture, then it is often desirable to use mixtures that have comparatively low temperature glides, for example less than 10° C., preferably less than 7° C. and more preferably less that 5° C. Refrigerant compositions exhibiting glides of this order are known to be acceptable to the refrigeration industry. Such refrigerants include R-407C.

The composition of the invention may comprise at least one additional refrigerant component. If included, the additional component may be present in an amount of from about 1 to about 20, 30, 40 or 50% by weight based on the total weight of the composition. If included, the at least one further refrigerant is preferably present in an amount of from about 1 to about 10% by weight of the composition, preferably from about 1 to about 6% by weight of the composition and more preferably from about 1 to about 5% by weight of the composition.

If a further refrigerant is added to the compositions of the invention, the relative amounts of R-32, R-134a and R-1243zf may or may not be altered.

For example, 10% by weight of a further refrigerant is added to a composition comprising 6% R-32, 7% R-134a and 87% 1243zf w/w. The amounts of all of R-32, R-134a and R-1243zf will be reduced accordingly in the quaternary composition thus-formed.

Put another way the compositions of the invention may comprise a composition comprising R-32, R-134a and R-1243zf (preferably in the amounts hereinbefore described) and a further refrigerant (preferably in the amounts hereinbefore described).

Alternatively, a portion of one or more of R-32, R-134a and R-1243zf may be replaced by the further refrigerant. For instance, in the above example, the further refrigerant may be added at the expense of the R-1243zf, resulting in a composition comprising 6% R-32, 7% R-134a, 77% 1243zf and 10% of the further refrigerant w/w.

All amounts mentioned in compositions herein, including in the claims, are by weight based on the total weight of the composition.

The heat transfer compositions are suitable for use in existing designs of equipment, and are compatible with all classes of lubricant currently used with established HFC refrigerants. They may be optionally stabilized or compatibilized with mineral oils by the use of appropriate additives.

Preferably, when used in heat transfer equipment, the composition of the invention is combined with a lubricant.

Conveniently, the lubricant is selected from the group consisting of mineral oil, silicone oil, polyalkyl benzenes (PABs), polyol esters (POEs), polyalkylene glycols (PAGs), polyalkylene glycol esters (PAG esters), polyvinyl ethers (PVEs), poly (alpha-olefins) and combinations thereof.

Advantageously, the lubricant further comprises a stabiliser.

Preferably, the stabiliser is selected from the group consisting of diene-based compounds, phosphates, phenol compounds and epoxides, and mixtures thereof.

Conveniently, the refrigerant composition further comprises an additional flame retardant.

Advantageously, the additional flame retardant is selected from the group consisting of tri-(2-chloroethyl)-phosphate, (chloropropyl) phosphate, tri-(2,3-dibromopropyl)-phosphate, tri-(1,3-dichloropropyl)-phosphate, diammonium phosphate, various halogenated aromatic compounds, antimony oxide, aluminium trihydrate, polyvinyl chloride, a fluorinated iodocarbon, a fluorinated bromocarbon, trifluoro iodomethane, perfluoroalkyl amines, bromo-fluoroalkyl amines and mixtures thereof.

Preferably, the composition is a heat transfer composition, preferably a refrigerant composition.

Preferably, the heat transfer device is a refrigeration device.

Conveniently, as FIG. 1 shows, the heat transfer device is selected from group consisting of automotive air conditioning systems, residential air conditioning systems, commercial air conditioning systems, residential refrigerator systems, residential freezer systems, commercial refrigerator systems, commercial freezer systems, chiller air conditioning systems, chiller refrigeration systems, and commercial or residential heat pump systems. Preferably it is an automotive air conditioning system.

Advantageously, the heat transfer device contains a centrifugal-type compressor.

The invention also provides the use of a composition of the invention in a heat transfer device as herein described.

According to a further aspect of the invention, there is provided a blowing agent comprising a composition of the invention.

Figure 2:
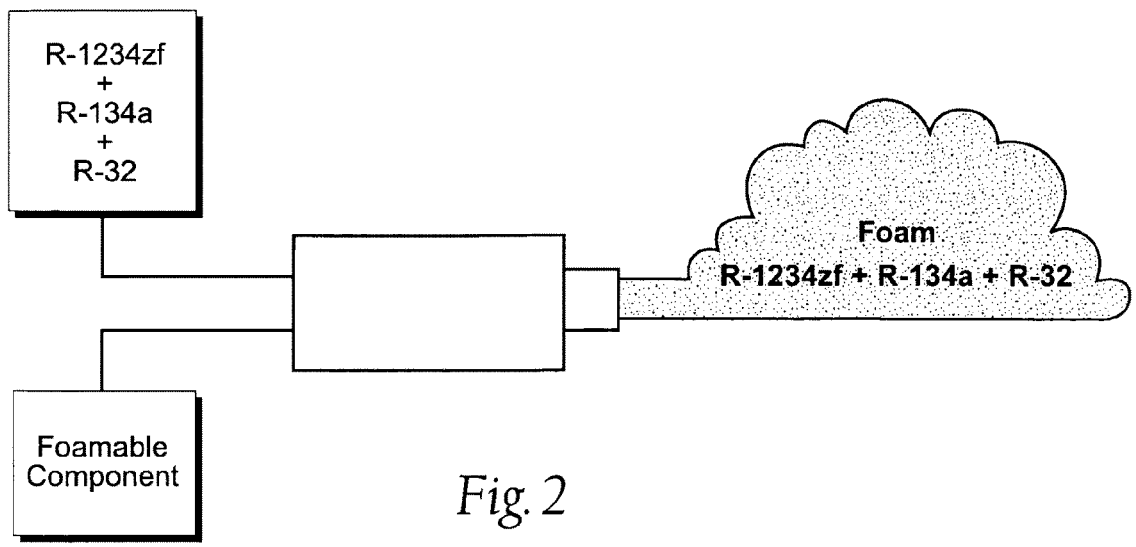
FIG. 2 is a diagrammatic view of a foam composition that includes R-1243zf (3,3,3 trifluoropropene), R-134a (1,1,1,2 tetrafluoroethane) and R-32 (difluoromethane).

According to another aspect of the invention (as FIG. 2 shows), there is provided a foamable composition comprising one or more components capable of forming foam and a composition of the invention.

Preferably, the one or more components capable of forming foam are selected from polyurethanes, thermoplastic polymers and resins, such as polystyrene, and epoxy resins.

According to a further aspect of the invention, there is provided a foam obtainable from the foamable composition of the invention.

Preferably the foam comprises a composition of the invention.

Figure 3:
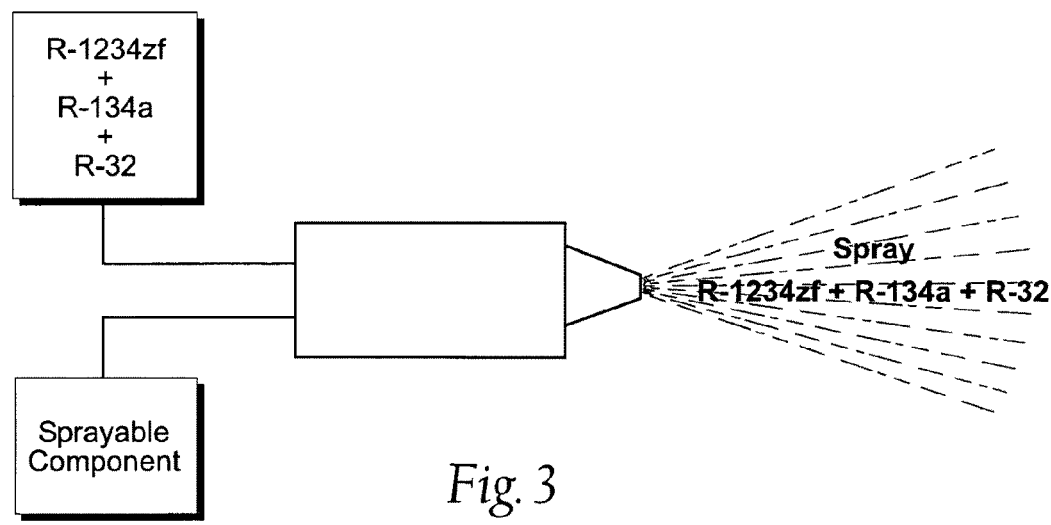
FIG. 3 is a spray comprising a material to be sprayed and a propellant composition comprising R-1243zf (3,3,3 trifluoropropene), R-134a (1,1,1,2 tetrafluoroethane) and R-32 (difluoromethane).
Figure 4:
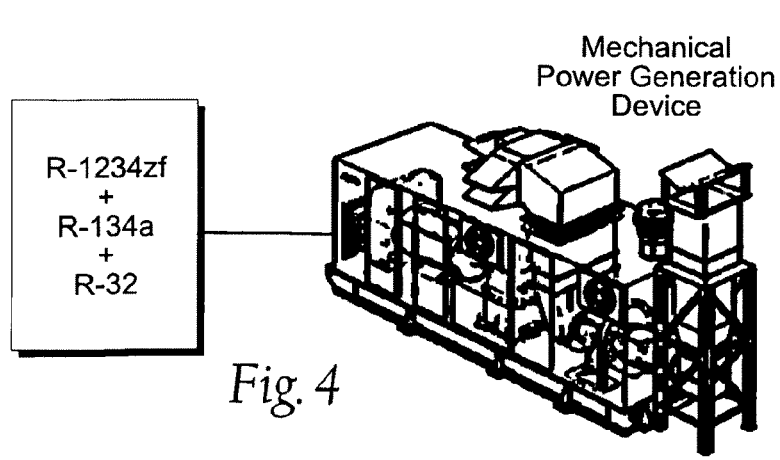
FIG. 4 is a mechanical power generation device using as a fuel source a composition comprising R-1243zf (3,3,3 trifluoropropene), R-134a (1,1,1,2 tetrafluoroethane) and R-32 (difluoromethane).

According to another aspect of the invention (as shown in FIG. 3), there is provided a sprayable composition comprising a material to be sprayed and a propellant comprising a composition of the invention.

According to a further aspect of the invention, there is provided a method for cooling an article which comprises condensing a composition of the invention and thereafter evaporating said composition in the vicinity of the article to be cooled.

According to another aspect of the invention, there is provided a method for heating an article which comprises condensing a composition of the invention in the vicinity of the article to be heated and thereafter evaporating said composition.

According to a further aspect of the invention, there is provided a method for extracting a substance from biomass comprising contacting the biomass with a solvent comprising a composition of the invention, and separating the substance from the solvent.

According to another aspect of the invention, there is provided a method of cleaning an article comprising contacting the article with a solvent comprising a composition of the invention.

According to a further aspect of the invention, there is provided a method for extracting a material from an aqueous solution comprising contacting the aqueous solution with a solvent comprising a composition of the invention, and separating the substance from the solvent.

According to another aspect of the invention, there is provided a method for extracting a material from a particulate solid matrix comprising contacting the particulate solid matrix with a solvent comprising a composition of the invention, and separating the substance from the solvent.

According to a further aspect of the invention (as shown in FIG. 5), there is provided a mechanical power generation device containing a composition of the invention.

Preferably, the mechanical power generation device is adapted to use a Rankine Cycle or modification thereof to generate work from heat.

In some circumstances, it is preferred for the compositions to have a GWP of about 150 or less. However, for other applications, it may be acceptable for composition to have a higher GWP, for example a GWP of up to 250, 500 or 750.

The GWP values of the candidate additional fluids dictate the maximum allowable percentages for each application. The internationally accepted GWP values for selected refrigerant fluids of the invention from the IPCC Third Assessment Report (2001) which are incorporated into European legislation on control of fluorinated gases are tabulated in the following list:

| Fluid | GWP |
|---|---|
| R-1243zf | 4 |
| R-134a | 1300 |
| R-161 | 12 |
| R-41 | 140 |
| R-125 | 3400 |
| $CO_2$ | 1 |
| R-600a | 3 |
| R-1225ye(E) | 3 |
| R-1225ye(Z) | 6 |
| R-152a | 120 |
| R-1270 | 3 |
| R-227ea | 3500 |
| R-143a | 4300 |
| R-32 | 550 |
| R-290 | 3 |

If the additional refrigerant has a GWP lower than the desired value then the maximum amount in the composition is dictated by considerations of flammability and similarity of the resulting mixture to the fluid it is intended to replace.

The refrigerant compositions may be altered by the skilled man to suit the application requirements and flammability characteristics so desired. In particular he may choose to add components, for example halocarbons, such as $CF_3I$, which are known to reduce or suppress flammability, to the refrigerant mixtures of the invention.

According to another aspect of the invention, there is provided a method of retrofitting a heat transfer device comprising the step of removing an existing heat transfer fluid, and introducing a composition of the invention. Preferably, the heat transfer device is a refrigeration device or an (automotive) air conditioning system. Advantageously, the method further comprises the step of obtaining an allocation of greenhouse gas (e.g. carbon dioxide) emission credit.

In a further aspect of the invention, there is provided a method for reducing the environmental impact arising from operation of a product comprising an existing compound or composition, the method comprising replacing at least partially the existing compound or composition with a composition of the invention. Preferably, this method comprises the step of obtaining an allocation of greenhouse gas emission credit.

By environmental impact we include the generation and emission of greenhouse warming gases through operation of the product.

This environmental impact can be considered as including not only those emissions of compounds or compositions having a significant environmental impact from leakage or other losses, but also including the emission of carbon dioxide arising from the energy consumed by the device over its working life. Such environmental impact may be quantified by the measure known as Total Equivalent Warming Impact (TEWI). This measure has been used in quantification of the environmental impact of certain stationary refrigeration and air conditioning equipment, including for example supermarket refrigeration systems.

The environmental impact may further be considered as including the emissions of greenhouse gases arising from the synthesis and manufacture of the compounds or compositions. In this case the manufacturing emissions are added to the energy consumption and direct loss effects to yield the measure known as Life-Cycle Carbon Production (LCCP). The use of LCCP is common in assessing environmental impact of automotive air conditioning systems.

Emission credit(s) are awarded for reducing pollutant emissions that contribute to global warming and may, for example, be banked, traded or sold. They are conventionally expressed in the equivalent amount of carbon dioxide. Thus if the emission of 1 kg of R-134a is avoided then an emission credit of 1×1300=1300 kg $CO_2$ equivalent may be awarded.

In another embodiment of the invention, there is provided a method for generating greenhouse gas emission credit(s) comprising (i) replacing an existing compound or composition with a composition of the invention, wherein the composition of the invention has a lower GWP than the existing compound or composition; and (ii) obtaining greenhouse gas emission credit for said replacing step.

In a preferred embodiment, the use of the composition of the invention results in the equipment having a lower Total Equivalent Warming Impact, and/or a lower Life-Cycle Carbon Production than that which would be attained by use of the existing compound or composition.

These methods may be carried out on any suitable product, for example in the fields of air-conditioning, refrigeration, heat transfer, blowing agents, aerosols or sprayable propellants, gaseous dielectrics, cryosurgery, veterinary procedures, dental procedures, fire extinguishing, flame suppression, solvents (e.g. carriers for flavorings and fragrances), cleaners, air horns, pellet guns, topical anesthetics, and expansion applications. Preferably, the field is air-conditioning, especially automotive air-conditioning.

Examples of suitable products include a heat transfer devices, blowing agents, foamable compositions, sprayable compositions, solvents and mechanical power generation devices. In a preferred embodiment, the product is a heat transfer device, such as a refrigeration device or an (automotive) air conditioning unit.

The existing compound or composition have an environmental impact as measured by greenhouse warming potential (GWP) and/or TEWI and/or LCCP that is higher than the composition of the invention which replaces it.

The existing compound or composition may comprise a fluorocarbon compound, such as a perfluoro-, hydrofluoro-, chlorofluoro- or hydrochlorofluoro-carbon compound or it may comprise a fluorinated olefin Preferably, the existing compound or composition is a heat transfer compound or composition such as a refrigerant. A preferred refrigerant that may be replaced is R-134a.

Any amount of the existing compound or composition may be replaced so as to reduce the environmental impact. This may depend on the environmental impact of the existing compound or composition being replaced and the environmental impact of the replacement composition of the invention. Preferably, the existing compound or composition in the product is fully replaced by the composition of the invention.

Advantageously, the existing compound or composition has a GWP of greater than 750 or 500 or 250 or 150 (as measured by methods described herein). The replacement composition of the invention preferably has a GWP less than 750 or 500 or 250 or 150.

EXAMPLE 1

The Peng Robinson equation of state has been used to calculate gas density, enthalpy and entropy data and has been used to predict latent heat of vaporisation and vapour equilibrium data for the mixtures of interest. The basic properties required by this equation (critical temperature, critical pressure and acentric factor) of the fluids with the exception of certain of the fluorinated propenes were taken from reliable open literature sources; chiefly the NIST Webbook site http://webbook.nist.gov. The critical properties of R-1243zf, R-1234yf, R-1225ye(E) and R-1225ye(Z) were determined by measurement using a static cell. The critical properties of the isomers of R-1252 were estimated using the normal boiling point and Joback's group contribution method. The acentric factor for R-1234yf, R1243zf, R-1225ye(Z) and R-1225ye(E) were calculated from measurements of the vapour pressure of each fluid. The acentric factors for the isomers of R-1252 were estimated using the Lee-Kesler correlation. Ideal gas enthalpy data for the fluorinated propenes were also estimated using Hyperchem® molecular modelling software and the Joback group contribution method; this was subsequently checked for accuracy against measured data for R-1225ye(E) and R-1234yf. The Joback and molecular modelling methods were found to give acceptable accuracy for ideal gas heat capacity of these fluids in the temperature range of interest for refrigeration and air conditioning (−40° C. to 200° C.). The Joback method was used for consistency in the determination of R1252 properties. All of these estimation techniques are described in the text "The Properties of Gases & Liquids" by R C Reid, J M Prausnitz & BE Poling, 4$^{th}$ edition, published McGraw-Hill.

The Peng Robinson equation uses a binary interaction constant to describe the vapour liquid equilibrium of binary pairs. This constant was set to zero where no data were available for mixture pairs; otherwise its value was chosen to give a good representation of the known or measured vapour-liquid equilibrium data at temperatures close to or below 0° C. This approach was taken as the distribution of the refrigerant components in an air conditioning system employing a mixed refrigerant is known to be determined principally by the equilibrium pertaining in the evaporator; which will operate at temperatures typically close to 0° C. Binary data for pairs among the fluids R-32/R-125/R-134a were obtained from measurements published in M. Nagel, K. Bier, *Int. J. Refrig.* 18 (1995) 534-543. Binary data for R-1225ye with R-1234yf were taken from U.S. patent application US2005/0233932A1. Binary data for R-32 with $CO_2$ were taken from Rivollet et al. *Fluid Phase Equilib* 218 (2004), pp. 95-101. Binary data for R-32 with R-1270 (propene) were taken from J. Chem. Eng. Data, 50 (2), 419-424, 2005. Binary data for R-1270 with R-134a and R-152a were taken from Kleiber *Fluid Phase Equilibria* 92 (1994) 149-194. The vapour liquid equilibria of selected binary pairs of fluids were measured using a static cell technique to measure the total pressure of a mixture of known composition. The data were then regressed using Barker's technique with the data points weighted using the maximum likelihood principle as outlined by Van Ness et al, AIChE Journal 24(6) 1055-1063 (1978) to account for measurement errors in temperature and pressure. This method was used to fit the required binary interaction parameters for use with the equation of state. Pairs measured for this work included: R-32/R-1243zf; R-32/R-1234yf; R-134a/R-1234yf; R-1243zf/R-1234yf; R-152a/R-1234yf; R-1225ye(Z)/R-1234yf; R-1224ye(Z)/R-32; R-1225ye/(Z)/R-1225ye(E); R-1225ye(Z)/R-134a; R-1243zf/R-1225ye(Z).

The performance of the refrigerant compositions of the invention was assessed under conditions representative of air conditioning as described in standard textbooks such as chapter 3 of R. C. Downing, Fluorocarbon Refrigerants Handbook, Prentice-Hall (1988). For this comparison, the mean evaporator temperature was set at 5° C. with 7° C. of useful superheat above the refrigerant dew point at the evaporation pressure. The mean condenser temperature was set at 50° C. with 5° C. of liquid sub-cooling below the refrigerant bubble point at the condensation pressure. The refrigerant performance for a range of R-32/R-1243zf/R-134a blends, characterised by the coefficient of performance (COP) and the refrigeration capacity relative to the refrigerant to be replaced, is presented in Appendix 1, which is incorporated fully herein. The COP is generally recognised as a measure of the efficiency of the refrigerant under the conditions of test. For a compressor of given volumetric displacement, a refrigerant having higher capacity will deliver a greater cooling effect. Further performance data of interest includes the system pressure ratio (Pr). As is known in the field, refrigerants having a lower Pr will tend to be more efficient than refrigerants with higher Pr under equivalent operating conditions through more efficient compressor operation.

The refrigerant performance of more R-32/R-1243zf/R-134a blends is shown in the table below, using the following parameters: 5° C. evaporator temperature, 5° C. of useful superheat, 15° C. suction return temperature, 50° C. condenser temperature, 5° C. of liquid subcool, 10 m³/hr compressor displacement with 70% compressor isentropic efficiency.

| | | | (kPa) EvapP | (kPa) Cond P | (kW) Capacity | % of R134a Capacity | (° C.) DischT | COP | % of R134a COP | (° C.) evap bubb-dew diff |
|---|---|---|---|---|---|---|---|---|---|---|
| R134a | | | 350 | 1318 | 6.38 | | 75.0 | 3.39 | | 0.0 |
| R152a | | | 315 | 1177 | 6.14 | | 87.0 | 3.54 | | 0.0 |
| R1243zf | | | 317 | 1128 | 5.45 | | 69.3 | 3.38 | | 0.0 |
| R1234yf | | | 371 | 1285 | 5.87 | | 64.5 | 3.23 | | 0.0 |
| R22 | | | 584 | 1943 | 9.98 | 156.4% | 94.3 | 3.37 | 99.4% | 0.0 |
| R407C | | | 607 | 2104 | 9.82 | 153.9% | 85.4 | 3.18 | 93.8% | 6.1 |
| Blend Composition (w %) | | | | | | | | | | |
| R32 | R134a | R1243zf | | | | | | | | |
| 1 | 1 | 0.1 | 98.9 | 322 | 1144 | 5.54 | 86.8% | 69.9 | 3.38 | 99.7% | 0.4 |
| 2 | 1 | 20 | 79 | 328 | 1179 | 5.7 | 89.3% | 70.9 | 3.38 | 99.7% | 0.5 |
| 3 | 30 | 0.1 | 69.9 | 487 | 1661 | 7.99 | 125.2% | 85.4 | 3.26 | 96.2% | 6.8 |
| 4 | 30 | 20 | 50 | 502 | 1738 | 8.34 | 130.7% | 86.7 | 3.25 | 95.9% | 6.8 |
| 5 | 1.5 | 0.5 | 98 | 325 | 1153 | 5.58 | 87.5% | 70.2 | 3.38 | 99.7% | 0.6 |
| 6 | 1.5 | 15 | 83.5 | 329 | 1178 | 5.71 | 89.5% | 70.9 | 3.38 | 99.7% | 0.7 |
| 7 | 2 | 0.5 | 97.5 | 327 | 1161 | 5.63 | 88.2% | 70.5 | 3.38 | 99.7% | 0.8 |

-continued

| | (kPa) EvapP | (kPa) Cond P | (kW) Capacity | % of R134a Capacity | (°C.) DischT | COP | % of R134a COP | (°C.) evap bubb-dew diff |
|---|---|---|---|---|---|---|---|---|
| 8 | 20 | 0.5 | 79.5 | 424 | 1474 | 7.13 | 111.8% | 80.3 | 3.31 | 97.6% | 5.5 |
| 9 | 20 | 15 | 65 | 434 | 1519 | 7.34 | 115.2% | 81.2 | 3.31 | 97.6% | 5.6 |
| 10 | 15 | 15 | 70 | 414 | 1423 | 6.89 | 108.0% | 78.6 | 3.33 | 98.2% | 4.7 |
| 11 | 3 | 1 | 96 | 332 | 1179 | 5.71 | 89.5% | 71.1 | 3.38 | 99.7% | 1.1 |
| 12 | 3 | 10 | 87 | 335 | 1195 | 5.79 | 90.8% | 71.5 | 3.38 | 99.7% | 1.2 |
| 13 | 10 | 1 | 89 | 369 | 1297 | 6.3 | 98.8% | 75.0 | 3.36 | 99.1% | 3.3 |
| 15 | 10 | 10 | 80 | 373 | 1318 | 6.4 | 100.3% | 75.5 | 3.36 | 99.1% | 3.4 |
| 16 | 4 | 3 | 93 | 338 | 1199 | 5.82 | 91.2% | 71.7 | 3.37 | 99.4% | 1.5 |
| 17 | 8 | 3 | 89 | 359 | 1267 | 6.15 | 96.4% | 74.0 | 3.36 | 99.1% | 2.8 |
| 18 | 12 | 1 | 87 | 379 | 1332 | 6.47 | 101.4% | 76.1 | 3.35 | 98.8% | 3.8 |
| 19 | 12 | 8 | 80 | 383 | 1349 | 6.55 | 102.7% | 76.5 | 3.35 | 98.8% | 3.9 |
| 20 | 12 | 15 | 73 | 387 | 1367 | 6.63 | 103.9% | 76.9 | 3.35 | 98.8% | 4.0 |
| 21 | 15 | 1 | 84 | 396 | 1385 | 6.72 | 105.3% | 77.7 | 3.34 | 98.5% | 4.6 |
| 22 | 15 | 8 | 77 | 400 | 1404 | 6.8 | 106.6% | 78.1 | 3.33 | 98.2% | 4.6 |
| 23 | 25 | 10 | 65 | 461 | 1600 | 7.71 | 120.9% | 83.5 | 3.28 | 96.8% | 6.3 |
| 24 | 30 | 10 | 60 | 492 | 1698 | 8.16 | 127.9% | 86.0 | 3.26 | 96.2% | 6.8 |
| 25 | 35 | 10 | 55 | 524 | 1799 | 8.63 | 135.3% | 88.5 | 3.23 | 95.3% | 7.1 |
| 26 | 40 | 10 | 50 | 557 | 1902 | 9.1 | 142.6% | 90.8 | 3.21 | 94.7% | 7.3 |

The results show that the composition of the invention exhibit comparable refrigerant performance to R-134a, R-152a, R-407 and R-22.

EXAMPLE 2

The lower flammability limit (LFL) of two R-32/R-1243zf/R-134a blends was measured as described hereinbefore at 60° C. and compared against the measured LFL of 1243zf alone and a blend of 134a/R-1243zf. The results were compared with LFL for each composition as measured using Le Chatalier's rule, which stipulates that the LFL of a mixed fuel is the volume-fraction average of the lower limits of the flammable components. The results are shown below.

| Fuel | Lower Flammable Limit (% v/v in air) | LFL calculated using Le Chatelier's rule |
|---|---|---|
| R-1243zf | 4.1% | 4.1% |
| R-134a/R-1243zf (10%/90% w/w) | 4.3% | 4.5% |
| R-32/R-134a/R-1243zf (6%/7%/87% w/w) | 5.1% | 4.8% |
| R-32/R-134a/R-1243zf (18%/6%/76% w/w) | 4.8% | 5.5% |

The theoretical refrigeration performance and operating pressure of the R-32/R-134a/R-1243zf (6%/7%/87% w/w) blend was calculated and compared against R-134a, R-1234yf and R-1243zf. The data was calculated under conditions typical of those seen in automotive air-conditioning (mean evaporating temperature 5° C.; mean condensing temperature 50° C.; compressor suction temperature 15° C.; 5K of subcooling and 5K of evaporator superheat; compressor isentropic efficiency 70%). The results are shown below.

| | R-134a | R-1234yf | R-1243zf | R-32/R-134a/R-1243zf (6%/7%/87% w/w) |
|---|---|---|---|---|
| Volumetric refrigeration capacity (kJ/m$^3$) | 2305 | 2199 | 1979 | 2310 |
| Coefficient of Performance (COP) | 3.41 | 3.30 | 3.40 | 3.40 |
| Evaporation pressure (bar abs) | 3.48 | 3.71 | 3.17 | 3.70 |
| Refrigerant flow required to deliver 10 kW cooling capacity (kg/hr) | 251 | 319 | 251 | 242 |

It can be seen that the R-32/R-134a/R-1243zf blend has superior properties compared to R-1234yf and R-1243zf alone. This blend has comparable refrigeration capacity and COP, but an increased evaporation pressure, compared to R-134a alone. This is advantageous because the lower the operating pressure, the more pressure drop can be expected in the hoses or lines leading to and from the air conditioning refrigerant compressor. Increased pressure drop contributes to increased energy consumption.

The R-32/R-134a/R-1243zf (6%/7%/87% w/w) blend has a 100-year GWP of 144 if calculated using the most recent Intergovernmental Panel on Climate Change (IPCC) data (so-called AR4 values), or 127 if calculated using the last issue of IPCC data (so-called Third Assessment Report (TAR) data) as encoded in the European F-Gas Directive.

EXAMPLE 3

The performance of the R-32/R-134a/R-1243zf (6%/7%/87% w/w) blend was evaluated in a laboratory calorimeter bench test program using the components of a standard production model of automotive air conditioning system designed for R-134a. The system consisted of: a microchannel evaporator; a suction line hose; a fixed displacement compressor; a discharge line hose; a condenser unit; a liquid return line and a thermostatic control valve.

The system was assembled using two psychometric wind tunnels inside calorimeter enclosures to supply air at controlled rate, temperature and humidity to the evaporator and condenser units. Pressure drops in the system hoses were balanced to ensure that they would be equivalent to those seen in an assembled system. The compressor speed could be altered by adjusting the drive pulley ratio. Cooling performance was evaluated by measuring the heat gained and lost by the air flowing through the evaporator and condenser units and by measuring the total energy balance over the calorimeter.

The system was operated firstly on R-134a to check that the performance at standard rating points was consistent with expected values and that the optimal refrigerant charge was as expected. Then a series of rating tests were conducted using the R-32/R-134a/R-1243zf (6%/7%/87% w/w) blend. The only alterations made to the system for the new fluid were that the optimal charge mass, using the same standard procedure as for determination of optimal R-134a charge, was found to be 88% of the R-134a charge, and that the expansion valve was adjusted by ¼ turn to attain correct superheat values leaving the evaporator.

The performance of the two fluids was determined using the system operated at 35° C. ambient air temperature having a relative humidity of 40% and with the compressor operated at 3 different speeds (900 rpm, 2500 rpm and 4000 prm). Table 1 shows the measured cooling duty and Coefficient of Performance for the two fluids:

| Compressor speed | R-134a cooling duty (kW) | R-134a Coefficient of Performance | (Jun. 7, 1987) blend cooling duty (kW) | (Jun. 7, 1987) blend Coefficient of Performance |
|---|---|---|---|---|
| 900 | 4.99 | 3.35 | 5.01 | 3.32 |
| 2500 | 6.38 | 1.94 | 6.75 | 1.98 |
| 4000 | 6.66 | 1.58 | 7.12 | 1.63 |

It can be seen that the mixed refrigerant delivered equal or higher capacities at the same compressor displacement. The compressor speed for the blend was then adjusted to match the capacity of R-134a at its 2500 rpm rating point. The comparative data are shown below:

Compressor speed required for capacity match:
1729 rpm
Coefficient of Performance: 2.45
Cooling Duty: 6.43 kW It can be seen that when the compressor displacement is altered to match the capacity, then the energy efficiency of the mixed refrigerant is higher than that of R-134a by approximately 27% at this rating point.

EXAMPLE 4

Thermal stability tests of R-32, R-134a and R-1243zf with commercially available PAG oils for automotive air conditioning use were carried out as follows.

Autoclaves were washed with soap and water before being rinsed with acetone and blown with dry air. The autoclaves were then placed in an oven to dry out more fully.

The initial moisture level of the lubricants Nippon-Denso ND8 and Ford YN12 was then measured by known weight injection into a calibrated Karl Fischer instrument. The lubricant was then dried by purging in a "Dreschel" bottle with dry nitrogen to approximately 100 ppm w/w moisture.

The lubricant was also tested for Total Acid Number (TAN) by titration with 0.1 M alcoholic Potassium Hydroxide solution, and colour (Hazen Units, HU) by comparative testing using a Lovibond Colour Comparator.

Approximately 50 g of the lubricant was then added to the autoclave, followed by metal test pieces (twists of aluminium, copper and iron) of known mass.

The sealed autoclaves were then evacuated with a vacuum pump for several minutes before cooling (using a freezer and/or dry ice). Approximately 60 g of refrigerant was then added to the autoclave by vacuum distillation before placing the autoclaves in a thermostatically controlled oven at 175° C. for two weeks.

After two weeks the autoclaves were removed from the oven and the refrigerant gas removed. The lubricant was then re-analysed for moisture, total acid number and colour. The results are shown below.

| | | BEFORE TEST | | | AFTER TEST | | |
|---|---|---|---|---|---|---|---|
| Refrigerant | Lubricant | Moisture (ppm) | T.A.N (mg KOH/g) | Colour (Hazens) | Moisture (ppm) | T.A.N (mg KOH/g) | Colour (Hazens) |
| R32 | ND8 | 78.5 | <0.01 | 10 | 46 | <0.01 | 50 |
| R-134a | ND8 | 120 | 0.01 | 10 | 237 | 0.03 | 50 |
| R-134a | YN12 | 30.9 | 0.18 | 10 | 54.1 | 0.12 | 50 |
| 1243zf | ND8 | 93.6 | Nil | 30 | 296 | 0.18 | 125 |
| 1243zf | ND8 | 93.6 | Nil | 30 | 117 | 0.21 | 150 |
| 1243zf | ND8 | 93.6 | Nil | 30 | 204 | 0.16 | 150 |
| 1243zf | YN12 | 96.9 | 0.18 | 60 | 106 | 0.11 | 85 |
| 1243zf | YN12 | 96.9 | 0.18 | 60 | 123 | 0.09 | 85 |
| 1243zf | YN12 | 96.9 | 0.18 | 60 | 130 | 0.11 | 85 |

No visible corrosion or tarnish of the metal pieces was observed. There was a small and acceptable change in Total Acid Number and colour for all three refrigerants, indicating a high degree of thermal stability for the R-32/R-134a/R-1243zf blends.

APPENDIX 1

| R32 % w/w | R1243zf % w/w | R134a % w/w | GWP | COP | Pressure ratio | Condenser Glide K | Evaporator Glide K | Condenser pressure bara | Evaporator pressure bara | Discharge temperature °C. | Volumetric capacity kJ/m³ | Relative capacity | Relative COP |
|---|---|---|---|---|---|---|---|---|---|---|---|---|---|
| 0 | 0 | 100 | 1300 | 3.206 | 3.79 | 0.0 | 0.0 | 13.21 | 3.48 | 78.7 | 2332 | 99.98% | 100.00% |
| 0 | 10 | 90 | 1170 | 3.206 | 3.76 | 0.0 | 0.0 | 13.02 | 3.47 | 77.9 | 2301 | 98.66% | 99.98% |
| 0 | 20 | 80 | 1041 | 3.205 | 3.72 | 0.1 | 0.0 | 12.84 | 3.45 | 77.1 | 2270 | 97.35% | 99.96% |
| 0 | 30 | 70 | 911 | 3.204 | 3.69 | 0.1 | 0.0 | 12.66 | 3.43 | 76.3 | 2240 | 96.04% | 99.93% |
| 0 | 40 | 60 | 782 | 3.203 | 3.66 | 0.1 | 0.0 | 12.49 | 3.41 | 75.6 | 2208 | 94.74% | 99.90% |
| 0 | 50 | 50 | 652 | 3.202 | 3.64 | 0.1 | 0.0 | 12.31 | 3.39 | 74.9 | 2179 | 93.44% | 99.88% |
| 0 | 60 | 40 | 522 | 3.201 | 3.61 | 0.1 | 0.0 | 12.14 | 3.36 | 74.2 | 2149 | 92.15% | 99.82% |
| 0 | 70 | 30 | 393 | 3.199 | 3.58 | 0.1 | 0.0 | 11.97 | 3.34 | 73.6 | 2119 | 90.87% | 99.76% |
| 0 | 80 | 20 | 263 | 3.197 | 3.56 | 0.1 | 0.0 | 11.81 | 3.32 | 72.9 | 2089 | 89.59% | 99.70% |
| 0 | 90 | 10 | 134 | 3.194 | 3.54 | 0.1 | 0.0 | 11.65 | 3.29 | 72.3 | 2060 | 88.33% | 99.62% |
| 0 | 100 | 0 | 4 | 3.192 | 3.52 | 0.0 | 0.0 | 11.48 | 3.27 | 71.7 | 2031 | 87.07% | 99.54% |
| 10 | 0 | 90 | 1225 | 3.194 | 3.77 | 3.9 | 2.9 | 15.86 | 4.21 | 84.7 | 2810 | 120.52% | 99.82% |
| 10 | 10 | 80 | 1095 | 3.197 | 3.74 | 4.0 | 2.9 | 15.61 | 4.18 | 83.8 | 2769 | 118.75% | 99.69% |
| 10 | 20 | 70 | 966 | 3.200 | 3.71 | 4.1 | 2.9 | 15.37 | 4.14 | 82.9 | 2730 | 117.05% | 99.79% |
| 10 | 30 | 60 | 836 | 3.202 | 3.63 | 4.2 | 2.9 | 15.13 | 4.11 | 82.1 | 2689 | 115.32% | 99.85% |
| 10 | 40 | 50 | 707 | 3.203 | 3.58 | 4.3 | 2.9 | 14.89 | 4.07 | 81.3 | 2649 | 113.61% | 99.90% |
| 10 | 50 | 40 | 577 | 3.203 | 3.64 | 4.3 | 2.9 | 14.66 | 4.03 | 80.6 | 2609 | 111.88% | 99.90% |
| 10 | 60 | 30 | 447 | 3.204 | 3.61 | 4.4 | 2.8 | 14.44 | 4.00 | 79.9 | 2571 | 110.23% | 99.93% |
| 10 | 70 | 20 | 318 | 3.205 | 3.59 | 4.4 | 2.8 | 14.22 | 3.96 | 79.2 | 2533 | 108.60% | 99.95% |
| 10 | 80 | 10 | 188 | 3.205 | 3.57 | 4.4 | 2.8 | 14.00 | 3.92 | 78.5 | 2495 | 107.00% | 99.97% |
| 10 | 90 | 0 | 59 | 3.206 | 3.55 | 4.4 | 2.8 | 13.79 | 3.89 | 77.8 | 2458 | 105.42% | 99.97% |
| 20 | 0 | 80 | 1150 | 3.174 | 3.70 | 5.4 | 4.7 | 18.27 | 4.94 | 89.8 | 3252 | 139.47% | 98.99% |
| 20 | 10 | 70 | 1020 | 3.160 | 3.68 | 5.6 | 4.6 | 17.96 | 4.88 | 88.9 | 3202 | 137.32% | 99.17% |
| 20 | 20 | 60 | 891 | 3.185 | 3.65 | 5.8 | 4.6 | 17.56 | 4.83 | 88.0 | 3153 | 135.22% | 99.32% |
| 20 | 30 | 50 | 761 | 3.189 | 3.63 | 6.0 | 4.6 | 17.36 | 4.78 | 87.1 | 3105 | 133.14% | 99.47% |
| 20 | 40 | 40 | 632 | 3.194 | 3.61 | 6.1 | 4.6 | 17.07 | 4.73 | 86.3 | 3057 | 131.10% | 99.60% |
| 20 | 50 | 30 | 502 | 3.198 | 3.69 | 6.2 | 4.7 | 16.79 | 4.68 | 85.5 | 3011 | 129.10% | 99.72% |
| 20 | 60 | 20 | 372 | 3.201 | 3.57 | 6.4 | 4.7 | 16.62 | 4.63 | 84.7 | 2965 | 127.13% | 99.83% |
| 20 | 70 | 10 | 243 | 3.204 | 3.55 | 6.5 | 4.7 | 16.26 | 4.58 | 84.0 | 2920 | 125.20% | 99.92% |
| 20 | 80 | 0 | 113 | 3.207 | 3.53 | 6.8 | 4.7 | 16.00 | 4.53 | 83.3 | 2876 | 123.31% | 100.01% |
| 30 | 0 | 70 | 1075 | 3.143 | 3.63 | 5.6 | 5.3 | 20.48 | 5.64 | 94.5 | 3654 | 156.70% | 98.03% |
| 30 | 10 | 60 | 945 | 3.152 | 3.61 | 5.9 | 5.4 | 20.12 | 5.57 | 93.5 | 3597 | 154.26% | 98.30% |
| 30 | 20 | 50 | 815 | 3.159 | 3.59 | 6.2 | 5.4 | 19.76 | 5.50 | 92.6 | 3540 | 151.80% | 98.51% |
| 30 | 30 | 40 | 686 | 3.168 | 3.57 | 6.4 | 5.5 | 18.41 | 5.44 | 91.7 | 3485 | 149.44% | 98.76% |
| 30 | 40 | 30 | 557 | 3.173 | 3.55 | 6.7 | 5.5 | 19.08 | 5.37 | 90.9 | 3431 | 147.13% | 98.96% |
| 30 | 50 | 20 | 427 | 3.180 | 3.53 | 6.9 | 5.6 | 18.75 | 5.31 | 90.0 | 3378 | 144.86% | 99.16% |
| 30 | 60 | 10 | 297 | 3.185 | 3.52 | 7.1 | 5.6 | 18.44 | 5.24 | 89.2 | 3326 | 142.64% | 99.34% |
| 30 | 70 | 0 | 168 | 3.191 | 3.60 | 7.3 | 5.7 | 18.13 | 5.18 | 88.4 | 3275 | 140.46% | 99.51% |
| 40 | 0 | 60 | 1000 | 3.104 | 3.67 | 5.1 | 5.2 | 22.53 | 6.32 | 99.1 | 4017 | 172.26% | 96.80% |
| 40 | 10 | 50 | 870 | 3.115 | 3.55 | 5.5 | 5.3 | 22.11 | 6.23 | 98.1 | 3954 | 169.56% | 97.16% |
| 40 | 20 | 40 | 741 | 3.126 | 3.53 | 5.9 | 5.4 | 21.71 | 6.16 | 97.1 | 3892 | 166.92% | 97.49% |
| 40 | 30 | 30 | 611 | 3.136 | 3.51 | 6.2 | 5.6 | 21.32 | 6.07 | 96.1 | 3832 | 164.32% | 97.80% |
| 40 | 40 | 20 | 482 | 3.145 | 3.50 | 6.5 | 5.7 | 20.94 | 5.98 | 95.2 | 3773 | 161.78% | 98.09% |
| 40 | 50 | 10 | 352 | 3.154 | 3.48 | 6.8 | 5.8 | 20.57 | 5.91 | 94.4 | 3714 | 159.28% | 98.35% |
| 40 | 60 | 0 | 222 | 3.162 | 3.47 | 7.1 | 5.9 | 20.22 | 5.83 | 93.5 | 3658 | 156.88% | 98.62% |
| 50 | 0 | 50 | 925 | 3.064 | 3.51 | 4.3 | 4.6 | 24.43 | 6.96 | 103.5 | 4350 | 186.52% | 95.54% |
| 50 | 10 | 40 | 795 | 3.077 | 3.50 | 4.7 | 4.8 | 23.97 | 6.88 | 102.4 | 4281 | 183.59% | 95.97% |
| 50 | 20 | 30 | 666 | 3.090 | 3.48 | 5.2 | 5.0 | 23.52 | 6.76 | 101.4 | 4214 | 180.71% | 96.36% |
| 50 | 30 | 20 | 536 | 3.101 | 3.47 | 5.6 | 5.2 | 23.08 | 6.66 | 100.5 | 4149 | 177.90% | 95.72% |
| 50 | 40 | 10 | 407 | 3.112 | 3.45 | 6.0 | 5.4 | 22.67 | 6.56 | 99.5 | 4084 | 175.15% | 87.07% |
| 50 | 50 | 0 | 277 | 3.123 | 3.44 | 6.4 | 5.6 | 22.26 | 6.47 | 96.6 | 4022 | 172.45% | 97.39% |
| 60 | 0 | 40 | 850 | 3.027 | 3.46 | 3.3 | 3.7 | 26.19 | 7.57 | 107.8 | 4659 | 199.79% | 94.39% |
| 60 | 10 | 30 | 720 | 3.041 | 3.45 | 3.8 | 4.0 | 25.68 | 7.45 | 106.7 | 4585 | 196.62% | 94.85% |
| 60 | 20 | 20 | 581 | 3.055 | 3.44 | 4.4 | 4.3 | 25.19 | 7.33 | 105.7 | 4513 | 193.52% | 95.28% |
| 60 | 30 | 10 | 481 | 3.068 | 3.42 | 4.6 | 4.5 | 24.72 | 7.22 | 104.7 | 4442 | 190.48% | 95.69% |
| 60 | 40 | 0 | 332 | 3.080 | 3.41 | 5.3 | 4.8 | 24.27 | 7.11 | 103.8 | 4373 | 187.51% | 96.08% |
| 70 | 0 | 30 | 775 | 2.995 | 3.42 | 2.3 | 2.8 | 27.80 | 8.14 | 112.0 | 4949 | 212.20% | 93.40% |
| 70 | 10 | 20 | 645 | 3.010 | 3.40 | 2.9 | 3.0 | 27.26 | 8.01 | 110.9 | 4889 | 208.78% | 93.88% |
| 70 | 20 | 10 | 516 | 3.024 | 3.40 | 3.5 | 3.4 | 28.73 | 7.87 | 109.9 | 4791 | 205.45% | 94.32% |
| 70 | 30 | 0 | 386 | 3.036 | 3.39 | 4.0 | 3.8 | 26.23 | 7.75 | 108.9 | 4716 | 202.21% | 94.74% |
| 80 | 0 | 20 | 700 | 2.968 | 3.38 | 1.4 | 1.6 | 29.27 | 8.67 | 116.2 | 6219 | 223.78% | 92.57% |
| 80 | 10 | 10 | 570 | 2.983 | 3.37 | 2.1 | 2.1 | 28.70 | 8.52 | 116.1 | 5134 | 220.13% | 93.04% |
| 80 | 20 | 0 | 441 | 2.998 | 3.36 | 2.7 | 2.5 | 28.14 | 8.37 | 114.1 | 5051 | 216.59% | 93.49% |
| 90 | 0 | 10 | 626 | 2.945 | 3.34 | 0.6 | 0.7 | 30.60 | 9.15 | 120.4 | 5468 | 234.47% | 91.84% |
| 90 | 10 | 0 | 495 | 2.959 | 3.34 | 1.3 | 1.2 | 30.00 | 8.99 | 119.3 | 5377 | 230.59% | 92.29% |
| 100 | 0 | 0 | 550 | 2.926 | 3.32 | 0.0 | 0.0 | 31.79 | 8.58 | 124.6 | 5697 | 244.31% | 91.23% |

We claim:

1. A composition comprising from about 2 to about 15% R-32(difluoromethane) w/w, from about 0.5 to about 15% R-134a (1,1,1,2 tetrafluoroethane)w/w, and from about 70 to about 97.5% R-1243zf (3,3,3 trifluoropropene)w/w.

2. A method for reducing the environmental impact arising from operation of a product comprising an existing compound or composition, the method comprising replacing at least partially the existing compound or composition with a composition according to claim 1.

3. A composition according to claim 1 which is azeotrope-like.

4. A composition according to claim 1 which has a GWP of about 750 or less.

5. A composition according to claim 1 further comprising a lubricant.

6. A composition according to claim 5 wherein the lubricant is selected from mineral oil, silicone oil, polyalkyl benzenes (PABs), polyol esters (POEs), polyalkylene glycols (PAGs), polyalkylene glycol esters (PAG esters), polyvinyl ethers (PVEs), poly (alpha-olefins) and combinations thereof.

7. A composition according to claim 1 further comprising a stabiliser.

8. A composition according to claim 7 wherein the stabiliser is selected from diene-based compounds, phosphates, phenol compounds and epoxides, and mixtures thereof.

9. A composition according to claim 1 further comprising an additional flame retardant.

10. A composition according to claim 9 wherein the additional flame retardant is selected from tri-(2-chloroethyl)-phosphate, (chloropropyl)phosphate, tri-(2,3-dibromopropyl)-phosphate, tri-(1,3-dichloropropyl)-phosphate, diammonium phosphate, various halogenated aromatic compounds, antimony oxide, aluminium trihydrate, polyvinyl chloride, a fluorinated iodocarbon, a fluorinated bromocarbon, trifluoroiodomethane, perfluoroalkyl amines, bromofluoroalkyl amines and mixtures thereof.

11. A composition according to claim 1 wherein the composition is non-flammable.

12. A composition according to claim 1 which is a refrigerant composition.

13. A method according to claim 2 wherein the existing compound or composition is a heat transfer composition.

14. A composition according to claim 1 comprising from about 3 to about 10% R-32 w/w, from about 1 to about 10% R-134a w/w, and from about 75 or 80 to about 96% R-1243zf w/w.

15. A composition according to claim 1 comprising from about 4 to about 8% R-32 w/w, from about 3 to about 9% R-134a w/w, and from about 83 to about 93 R-1243zf w/w.

16. A composition according to claim 1 wherein the composition has a capacity within 10% of that of the fluid it is intended to replace, for example R-134a.

17. A composition according to claim 1 which is azeotrope-like.

18. A composition according to claim 1 which has a GWP of about 750 or less.

19. A composition according to claim 1 which has a GWP of about 150 or less.

20. A composition according to claim 1 which has a GWP of about 100 or less.

21. A composition according to claim 1 further comprising a lubricant.

22. A composition according to claim 21 wherein the lubricant is selected from mineral oil, silicone oil, polyalkyl benzenes (PABs), polyol esters (POEs), polyalkylene glycols (PAGs), polyalkylene glycol esters (PAG esters), polyvinyl ethers (PVEs), poly (alpha-olefins) and combinations thereof.

23. A composition according to claim 1 further comprising a stabiliser.

24. A composition according to claim 23 wherein the stabiliser is selected from diene-based compounds, phosphates, phenol compounds and epoxides, and mixtures thereof.

25. A composition according to claim 1 further comprising an additional flame retardant.

26. A composition according to claim 25 wherein the additional flame retardant is selected from tri-(2-chloroethyl)-phosphate, (chloropropyl)phosphate, tri-(2,3-dibromopropyl)-phosphate, tri-(1,3-dichloropropyl)-phosphate, diammonium phosphate, various halogenated aromatic compounds, antimony oxide, aluminium trihydrate, polyvinyl chloride, a fluorinated iodocarbon, a fluorinated bromocarbon, trifluoroiodomethane, perfluoroalkyl amines, bromofluoroalkyl amines and mixtures thereof.

27. A composition according to claim 1 wherein the composition is non-flammable.

28. A composition according to claim 1 which is a refrigerant composition.

29. A heat transfer device containing a composition according to claim 1.

30. A method according to claim 13 wherein the heat transfer composition comprises R-134a.

31. A heat transfer device according to claim 29 which is a refrigeration device.

32. A heat transfer device according to claim 31 which is selected from automotive air conditioning systems, residential air conditioning systems, commercial air conditioning systems, residential refrigerator systems, residential freezer systems, commercial refrigerator systems, commercial freezer systems, chiller air conditioning systems, chiller refrigeration systems and heat pump systems.

33. A heat transfer device according to claim 32 which is an automotive air conditioning system.

34. A heat transfer device according to claim 29 which contains a compressor.

35. A method comprising providing a composition according to claim 1, and using the composition in a heat transfer device.

36. A blowing agent comprising a composition according to claim 1.

37. A foamable composition comprising one or more components capable of forming foam selected from polyurethanes, thermoplastic polymers and resins, such as polystyrene, and epoxy resins, and mixtures thereof, and a composition according to claim 1.

38. A foam obtainable from the foamable composition of claim 37.

39. A sprayable composition comprising a material to be sprayed and a propellant comprising a composition according to claim 1.

40. A method for cooling an article which comprises condensing a composition according to claim 1, and thereafter evaporating the composition in the vicinity of the article to be cooled.

41. A method for heating an article which comprises condensing a composition according to claim 1 in the vicinity of the article to be heated, and thereafter evaporating the composition.

42. A method for extracting a substance from biomass comprising contacting the biomass with a solvent comprising a composition according to claim 1 and separating the substance from the solvent.

43. A method of cleaning an article comprising contacting the article with a solvent comprising a composition according to claim 1.

44. A method for extracting a material from an aqueous solution comprising contacting the aqueous solution with a solvent comprising a composition according to claim 1, and separating the substance from the solvent.

45. A method for extracting a material from a particulate solid matrix comprising contacting the particulate solid matrix with a solvent comprising a composition according to claim 1, and separating the substance from the solvent.

46. A mechanical power generation device containing a composition according to claim 1.

47. A mechanical power generation device according to claim 46 which is adapted to use a Rankine Cycle or modification thereof to generate work from heat.

48. A method of retrofitting a heat transfer device comprising the step of removing an existing heat transfer fluid, and introducing a composition according to claim 1.

49. A method according to claim 48 wherein the heat transfer device is a refrigeration device.

50. A method according to claim 48 wherein the heat transfer device is an automotive air conditioning system.

51. A method according to 2 wherein the existing compound or composition has a GWP of greater than 150.

52. A method for generating greenhouse gas emission credit comprising (i) replacing an existing compound or composition with a according to claim 1, wherein the composition has a lower GWP than the existing compound or composition.

53. A method of claim 52 wherein the use of the composition of the invention results in a lower Total Equivalent Warming Impact, and/or a lower Life-Cycle Carbon Production than is be attained by use of the existing compound or composition.

54. A method of claim 52 or 53 carried out on a product from the fields of air-conditioning, refrigeration, heat transfer, blowing agents, aerosols or sprayable propellants, gaseous dielectrics, cryosurgery, veterinary procedures, dental procedures, fire extinguishing, flame suppression, solvents (e.g. carriers for flavorings and fragrances), cleaners, air horns, pellet guns, topical anesthetics, and expansion applications.

55. A method according to claim 54 wherein the product is selected from a heat transfer device, a blowing agent, a foamable composition, a sprayable composition, a solvent or a mechanical power generation device.

56. A method according to claim 55 wherein the product is a heat transfer device.

57. A method according to claim 52 wherein the product is selected from a heat transfer device, a blowing agent, a foamable composition, a sprayable composition, a solvent or a mechanical power generation device.

58. A method according to claim 57 wherein the product is a heat transfer device.

* * * * *